United States Patent [19]

Hastings et al.

[11] 3,945,964

[45] Mar. 23, 1976

[54] AQUEOUS EPOXY EMULSIONS

[76] Inventors: Garth Winton Hastings, 23 Belair Ave., Carringbah; Wade Arthur Wyatt, 173 High St., Willoughby, both of Australia

[22] Filed: May 10, 1974

[21] Appl. No.: 468,657

Related U.S. Application Data

[63] Continuation-in-part of Ser. No. 400,518, Sept. 25, 1973, abandoned, which is a continuation of Ser. No. 234,639, March 14, 1972, abandoned.

[30] Foreign Application Priority Data

Mar. 19, 1971  Australia.............................. 4365/71
Oct. 15, 1971  Australia.............................. 6668/71

[52] U.S. Cl. ..... 260/29.6 NR; 204/181; 260/2.5 EP; 260/18 EP; 260/29.2 EP; 260/37 EP
[51] Int. Cl.² ......................... C08J 3/06; C08J 9/28
[58] Field of Search . 260/29.2 EP, 2.5 EP, 29.6 NR

[56] References Cited
UNITED STATES PATENTS

| | | | |
|---|---|---|---|
| 2,811,495 | 10/1957 | Wittcoff et al................ | 260/29.2 EP |
| 2,872,428 | 2/1959 | Schroeder..................... | 260/29.2 EP |
| 2,933,409 | 4/1960 | Binkley et al.................. | 260/29.2 EP |
| 3,049,449 | 8/1962 | Lundgren et al.............. | 260/29.2 EP |
| 3,168,488 | 2/1965 | Sommer........................ | 260/29.2 EP |
| 3,316,195 | 4/1967 | Grosner et al. ............... | 260/29.2 EP |
| 3,335,105 | 8/1967 | Burnthall et al. ............. | 260/29.2 EP |
| 3,376,245 | 4/1968 | Sample et al. ................ | 260/29.2 EP |
| 3,497,556 | 2/1970 | Lanner et al.................. | 260/29.2 EP |
| 3,634,305 | 1/1972 | Johnson et al. .............. | 260/29.2 EP |
| 3,661,267 | 5/1972 | Markley......................... | 260/2.5 EP |
| 3,669,911 | 6/1972 | Najvar............................ | 260/2.5 EP |

*Primary Examiner*—Murray Tillman
*Assistant Examiner*—Arthur H. Koeckert
*Attorney, Agent, or Firm*—Michael J. Striker

[57] ABSTRACT

Stable aqueous emulsions of epoxy resins containing as an emulsifying agent between 2 and 10% by weight relative to the weight of the epoxy resin of ethylene oxidepropylene oxide block polymers having the formulae

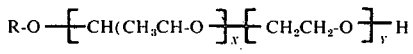

and

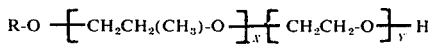

in which X is an integer of at least 8 and at most 22, Y is an integer from at least 25 and at most 40, and R is a radical of the group consisting of alkenyl, aralkyl, cycloalkyl, aralkenyl and cycloalkenyl radicals.

6 Claims, No Drawings

AQUEOUS EPOXY EMULSIONS

REFERENCE TO RELATED APPLICATIONS

This application is a continuation in part of our application Ser. No. 400,518, filed Sept. 25, 1973, which, in turn, is a continuation of our application Ser. No. 234,639, filed Mar. 14, 1972, both of which are now abandoned.

This invention relates to a stable aqueous emulsion of an epoxy resin.

Throughout this specification the term epoxy resin is used to refer collectively to oxirane group containing compounds and polymers and mixtures of these with other materials. An extensive series of epoxy resins are well known in the art and include compounds which may be subdivided into a number of classes as follows:

a. The Diglycidyl ethers of Bisphenol A. These are often referred to as "bisphenol A epoxy resins", they may be low molecular weight liquids or higher molecular weight solids or very high molecular weight resins usually supplied in solution of an organic solvent.

b. Brominated resins. These resins differ from the normal bisphenol A resin in that they contain chemically bound bromine atoms. The bromine acts as a flame retardant. A typical resin would be the diglycidyl ether of tetrabromo-bisphenol A and higher molecular weight species.

c. Epoxy phenol novolac and epoxy cresol novolac resins. These resins are prepared by adding oxirane functional groups to phenol novolac and cresol novolac resins. The resulting resins may be liquid or solid and when cured with suitable hardeners are claimed to have better heat resistance, chemical resistance and electrical properties than Bisphenol A epoxy resins.

d. Cycloaliphatic resins. In these resins, the oxirane functional group is attached to or is part of a cycloaliphatic group. These resins are said to have better weather resistance than Bisphenol A epoxy resins. A typical resin would be

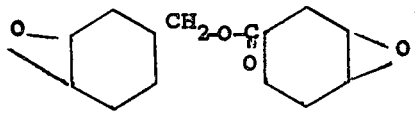

Further examples of epoxy resins are described in "Hand Book of Epoxy resins", by Lee and Neville 1967 edition published by McGraw-Hill Inc.

Epoxy resins are commonly used as thermoplastic surface coatings. A solution of the epoxy resin is applied to a suitable substrate and the solvent allowed to evaporate to leave a dry film. The lower molecular weight epoxy resins are normally mixed with a curing agent prior to the formation of the coating; the curing agent cross-links the epoxy resin molecules to form a hard infusible mass. This reaction is exploited not only in the preparation of epoxy surface coatings but also in the production of laminates, castings, adhesives, and in other applications.

The curing agent may be any one of the wide range of chemicals known to be useful for this purpose, however the curing agent is preferably an aliphatic amine, aromatic amine, polyimide or amido-amine, or acid anhydride.

In coating applications it is often necessary to add organic solvents to the mixture of the epoxy resins and the curing agent to reduce the viscosity of the mixture and to facilitate the application of the coating. While these organic solvents allow for ease of application and good film properties they do present serious problems. The solvents are expensive and are usually toxic or flammable. The problems of solvent pollution occur during manufacture storage, transportation and final application. Exhaust solvent fumes, waste solvents for cleansing equipment, and general spillage all present pollution problems, the solution of which is often difficult and expensive. These disadvantages seriously restrict the use of the prior art epoxy surface coatings, particularly in establishments connected with food handling or preparation. Furthermore cleaning of equipment that has been in contact with these coatings is notoriously difficult.

These disadvantages are overcome in the present invention which provides a stable aqueous epoxy resin emulsion having reduced viscosity and which do not need to be blended with organic solvents. The reduced viscosity increases the ease of handling and gives better brushing and levelling properties when used as a paint or other type of surface coating.

Absence of organic solvents removes the problems caused by odour, toxicity and flammability and all equipment contacted by the epoxy resins of the present invention can be cleaned by washing in water.

The emulsion of the present invention may also be blended with other water-based emulsions to alter the properties of these emulsions and improve water resistance, film-forming properties adhesion and resistance to heat and "creep".

The emulsion described herein may be combined with reinforcement materials including glass fibre, carbon fibre and ceramic fibres. The chemical resistance of the water-emulsifiable epoxy resin is combined with the mechanical properties of the reinforcement to give materials attractive for use as surgical implants and prostheses, lightweight corrosion resistant materials, laminates for structural applications and printed circuit boards.

The invention consists of a stable aqueous emulsion of an epoxy resin, said emulsion containing as an emulsifying agent, an effective amount of an ethylene oxide propylene oxide block copolymer having the formula:

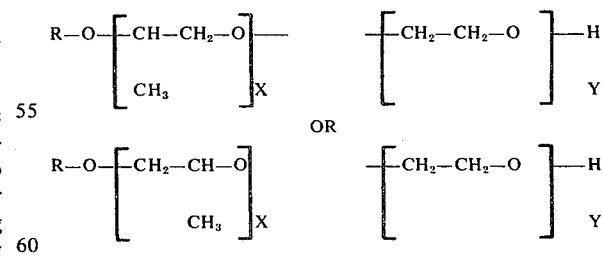

Where X has a value of from 8 to 22, Y has a value of from 25 to 40 and R is a radical selected from the group comprising alkenyl, aralkyl, cycloalkyl, aralkenyl, and cycloalkenyl.

It is preferred that R be an alkylphenyl radical having 3 to 18 carbon atoms in the alkyl group and particularly preferred that R be an octylphenyl, nonylphenyl, or decylphenyl radical.

The curing agent used for curing the epoxy resins contained in the emulsions according to this invention may be water soluble, oil soluble or both. If water soluble curing agents such as polyamides are used, these may be dissolved in water and when required mixed with the epoxy resin emulsion before use. Some water soluble curing agents such as urea-formaldehyde and melamineformaldehyde resins only react with epoxy resins at elevated temperatures. One component heat curing epoxy resin systems can be prepared using such curing agents. The preferred curing agents however, are aromatic amines, aromatic amine adducts and mixtures thereof or mixtures of these with a polyamide curing agent. Aromatic amines and aromatic amine adducts are curing agents of the oil soluble type and they may be emulsified by dispersing them in aqueous emulsions of such thermoplastic polymers as vinyl homopolymers, vinyl copolymers, acrylic polymers, acrylic copolymers, or mixtures thereof. Curing agents containing aqueous polymer emulsions of the type described in the preceding paragraph are stable indefinitely, preferably contain about 60% by weight of solids, and preferably comprise about 20% by weight of the curing agent. Immediately prior to use, the epoxy resin emulsion and the curing agent polymer emulsion are mixed and stirred well.

The "pot life" of water-emulsifiable epoxy resins/curing agent mixtures prepared by the above method is several hours compared with the ½ to 1 hour pot life of the prior art epoxy resins/curing agent mixtures. Applied as a surface coating, the water emulsifiable epoxy resins/curing agent mixtures of the present invention present a surface free from "tack" remarkably rapidly, in from ½ to 1 hour after mixing the resin with the curing agent depending on the ambient conditions obtained at the time. Complete hardening is reached in from 24 to 36 hours, and the curing coating is hard, smooth, highly glossy and outstandingly resistant to mechanical abrasion and chemical attack. The cured coating is also completely safe for uses connected with food preparation and handling.

In order that the invention may be better understood, the following are given as examples only and should not be construed as being in any way limiting.

EXAMPLE 1

A general composition using a solvent to reduce the viscosity of the resin and to dissolve the emulsifier.

| Epoxy Resin Emulsion | Parts by Weight |
| --- | --- |
| Epoxy resin (Epon 828 manufactured by Shell Chemicals) | 100 |
| Butyl triglycol ether | 60 to 40 |
| Emulsifier (Teric 200 manufactured by I.C.I. of Australia and New Zealand) | 10 to 2 |
| Curing Agent Solution | |
| Polyamide (Versamid 115) (Manufactured by General Mills) | 100 |
| Butyl triglycol ether | 100 |

The two components are mixed together and them emulsified by the slow addition of up to 150 mls. of water. The epoxy resin/curing agent emulsion thus formed has a wide application and is capable of further dilution with water.

EXAMPLES 2

Where a less viscous polyamide is used, such as VERSAMID 140, a solvent is dispensed with and a typical composition is given by:

| | Parts by Weight |
| --- | --- |
| Epoxy resin (Epon 828) | 100 |
| Polyamide (Versamid 140) | 60 |
| Emulsifier (Teric 200) | 2 |
| Water | 300 |

The resin is heated to 90°C and the emulsifier dissolved in it. The polyamide curing agent is then added with stirring. Water is added over about a 10 minute period with vigorous stirring to produce an epoxy resin/curing agent emulsion.

EXAMPLE 3

A primer for surface coating application is given by:

| | Parts by Weight |
| --- | --- |
| Epoxy resin (Epon 828) | 100 |
| Emulsifier (Teric 200) | 2 to 8 |
| Red iron oxide | 100 |
| Polyamide (Versamid 140) | 60 |
| Water | 300 |

EXAMPLE 4

A top coat for surface coating application.

| | Parts by Weight |
| --- | --- |
| Epoxy resin (Epon 828) | 100 |
| Emulsifier (Teric 200) | 2 to 8 |
| Titanium dioxide | 50 |
| Barytes | 80 |
| Polyamide (Versamid 140) | 60 |
| Water | 300 |

In the preparation of these emulsions it does not matter whether the organic components are first blended and water subsequently added, or whether the epoxy resin is made into an emulsion and then mixed with the curing agent, as is done in Example 5.

EXAMPLE 5

| Epoxy Resin Emulsion | Parts by Weight |
| --- | --- |
| Epoxy resin (Epon 828) | 100 |
| Emulsifier (Teric 200) | 5 |
| Water | 50 |
| Curing Agent Solution | |
| Aromatic amine adduct (HY850 manufactured by CIBA - GEIGY LIMITED) | 50 |
| Water | 180 |

Equal parts of the epoxy resin emulsion and the curing agent solution are mixed when required for use.

EXAMPLE 6

A two-component system for use as a surface coating.

| Epoxy Resin Emulsion | Parts by Weight |
| --- | --- |
| Epoxy resin (Epon 828) | 100 |

-continued

| Epoxy Resin Emulsion | Parts by Weight |
|---|---|
| Emulsifier (Teric 200) | 5 |
| Titanium dioxide | 50 |
| Barytes | 50 |
| Water | 50 |
| Curing Agent Solution | |
| Polyamide (Versamid 140) | 60 |
| Water | 180 |

The epoxy resin emulsion and the curing agent solution are mixed in the ratio of 25 parts by 24 parts.

EXAMPLE 7

An alternative curing agent for the surface coating of Example 6.

| | Parts by Weight |
|---|---|
| Polyamide (Versamid 140) | 20 |
| HY850 curing agent | 25 |
| Water | 193 |

This composition gives the optimum result, although it is possible to use compositions in the range:

| | Parts by Weight |
|---|---|
| Polyamid | 20 to 30 |
| Aromatic amine OR adduct | 10 to 50 |
| Water | 6 to 200 |

When the curing agent solution, as in Example 7, is mixed with the epoxy resin emulsion in the same ratio as shown for Example 6, a low viscosity emulsion is obtained which cures in 24 hours to give a hard, smooth, semi-gloss film having excellent adhesion to metal and showing no brush marks. The stability of the curing agent solution can be improved by the addition of fillers as in Example 8:

EXAMPLE 8

An improved curing agent is given by:

| | Parts by Weight |
|---|---|
| Polyamide (Versamid 140) | 20 |
| HY931 curing agent | 35 |
| Titanium dioxide | 25 |
| Superfine whiting | 25 |
| Stearate-coated calcium carbonate (Winnofil S supplied by ICI of Australia and New Zealand) | 10 |
| Water | 15 |

The curing agent may be carried between 25 and 35 parts by weight and the water between 15–20. This is stable up to 40°C.

Mixing 2 parts of the epoxy resin emulsion (Example 6) with 1 part 30 of the curing agent solution (Example 8) gives an emulsion containing 81% by weight of solids. This may be further reduced by additions of water down to 50% by weight of solids for roller or brush application.

EXAMPLE 9

A composition suitable for surface coating by electrode-position techniques is given by:

| | Parts by Weight |
|---|---|
| Epoxy resin (Epan 828) | 100 |
| Emulsifier (Teric 200) | 5 |
| Polyamide (Versamid 140) | 50 |
| Water | 1485 |

This formulation gives a 10% by weight solids emulsion. The pH of the medium is adjusted, by addition of 5N acetic acid, to the range 5.0 to 7.0 although it is still effective at 8.0. Lower pH values tend to cause corrosion. The applied voltage was 24.5V. The resultant film, of 20 to 25 microns thickness, was cured at 50°C to give a hard, homogeneous film within 6 hours.

EXAMPLE 10

The water emulsifiable epoxy resin of the present invention can also take the form of water-filled foams. These water-filled foams compositions can be cast in suitable moulds to provide hard, lightweight structural materials having many of the properties of timber and which can be worked with woodworking tools:

| | Parts by Weight |
|---|---|
| Epoxy resin (Epon 828) | 100 |
| Emulsifier (Teric 200) | 4 |
| Polyamide (Versamid 140) | 60 |

After thorough mixing 50 parts by weight of water are added with rapid stirring to form an emulsion. Hardening in a suitable mould occurs within 24 hours and the foam is hard enough to work with a wood chisel after 5 days.

EXAMPLE 11

A harder water-filled foam is given by the formulations:

| | Parts by Weight |
|---|---|
| Epoxy resin (Epon 828) | 100 |
| Emulsifier (Teric 200) | 4 |
| Polyamide (Versamid 140) | 60 |
| Whiting | 150 |
| Water | 50 |

EXAMPLE 12

A fast curing water-filled foam is given by:

| Epoxy Resin Emulsion | Parts by Weight |
|---|---|
| Epoxy resin (Epon 828) | 100 |
| Emulsifier (Teric 200) | 4 |
| Whiting | 150 |
| Curing Agent Solution | |
| Polyamide (Versamid 140) | 50 |
| HY837 curing agent | 50 |
| Water | 100 |

The epoxy resin emulsion and the curing agent are mixed in the proportions 100 parts by weight of epoxy resin emulsion to 20–30 parts by weight of curing agent solution and emulsified with the water. Curing to a hard product occurs in 24 hours at 25°C. Properties are comparable to a timber of Oregon type. There is no shrinking during cure at 25°–50°C but a weight loss from water evaporation is observed.

EXAMPLE 13

The most preferred embodiment of the present invention is an epoxy resin given by the following formulation:

| Epoxy Resin Emulsion | Parts by Weight |
|---|---|
| Epoxy resin (Epon 828) | 95 |
| Emulsifier (Teric 200) | 5 |
| Water | 50 |
| Curing Agent Emulsion | |
| HY850 curing agent | 30 |
| HY830 curing agent | 30 |
| Polyco 11785 ( a polyvinyl acetage emulsion produced by BORDN Chemical Co.) | 24 |
| Water | 16 |

The curing agent emulsion is prepared by slowly adding the curing agents to the polyvinyl acetate emulsion while high speed stirring is maintained. The water is then added to reduce viscosity to the desired value.

The example outlined above may also be used in formulation of adhesive systems. As an illustration, Example 13 is ideally suited as a new-to-old concrete adhesive and it can also be used to upgrade existing thermoplastic emulsion adhesives such as polyvinyl acetate adhesives. Such adhesives have the usual advantages associated with polyvinyl acetate adhesives, plus increased resistance to heat, water and creep.

The emulsifier Teric 200 referred to in the examples is an ethyleneoxide — propylene oxide block copolymer of the type according to this invention in which R is nonylphenyl X is from 8 to 22 and Y is from 25 to 40.

What is claimed is:

1. A stable aqueous emulsion of an epoxy resin, said emulsion containing, as an emulsifying agent, between 2 and 10% by weight relative to the weight of the epoxy resin, of an ethylene oxide-propylene oxide block copolymer having the formulae:

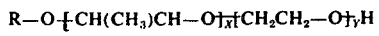

and

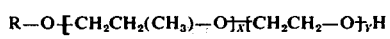

in which formulae X is an integer of at least 8 and at most 22, Y is an integer of at least 25 and at most 40, and R is a radical selected from the group consisting of alkenyl, aralkyl, cycloalkyl, aralkenyl and cycloalkenyl radicals.

2. A stable aqueous emulsion as claimed in claim 1 in which R is an alkylphenyl radical having from 3 to 18 carbon atoms in the alkyl group.

3. A stable aqueous emulsion as claimed in claim 2 in which R is an octyl phenyl, nonylphenyl or decylphenyl radical.

4. A stable aqueous emulsion as claimed in claim 1 in which the emulsion also contains a curing agent or hardener for the epoxy resin.

5. A stable aqueous emulsion as claimed in claim 4 in which the epoxy resin emulsion is blended with an emulsion of a thermoplastic polymer, the curing agent being dispersed in the thermoplastic polymer emulsion.

6. A stable aqueous emulsion as claimed in claim 1 in which the emulsion contains a reinforcing material selected from the group comprising glass fibres, carbon fibres and ceramic fibres.

* * * * *